United States Patent
Geist et al.

(10) Patent No.: US 11,894,024 B2
(45) Date of Patent: Feb. 6, 2024

(54) INFORMATION HANDLING SYSTEM STORAGE DRIVE CARRIER

(71) Applicant: Dell Products L.P., Round Rock, TX (US)

(72) Inventors: Edward D. Geist, Austin, TX (US); Jing-Tang Wu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 17/511,048

(22) Filed: Oct. 26, 2021

(65) Prior Publication Data

US 2023/0130498 A1   Apr. 27, 2023

(51) Int. Cl.
*G11B 33/12* (2006.01)
*G11B 33/04* (2006.01)

(52) U.S. Cl.
CPC ........ *G11B 33/124* (2013.01); *G11B 33/0405* (2013.01)

(58) Field of Classification Search
CPC ...................................................... H05K 5/00
See application file for complete search history.

(56) References Cited

U.S. PATENT DOCUMENTS

| | | | |
|---|---|---|---|
| 7,983,032 B2 | 7/2011 | Walker et al. | |
| 9,164,946 B2 | 10/2015 | Klughart | |
| 9,625,960 B1 * | 4/2017 | Ent | G11B 33/124 |
| 10,362,707 B2 | 7/2019 | Chiasson et al. | |
| 10,455,715 B2 * | 10/2019 | Choyikkunnil | H05K 5/0004 |
| 2011/0255218 A1 * | 10/2011 | Pakula | H04M 1/0252 |
| | | | 361/679.01 |
| 2020/0004302 A1 | 1/2020 | Heyd et al. | |

* cited by examiner

*Primary Examiner* — Jerry Wu
(74) *Attorney, Agent, or Firm* — ZAGORIN CAVE LLP; Robert W. Holland

(57) ABSTRACT

An information handling system storage bay accepts 2.5 inch and 3.5 inch storage drives held in a storage drive carrier sized to hold 3.5 inch storage drives and having an adapter that couples to the storage drive carrier to adapt it to hold 2.5 inch drives. The storage drive carrier is manufactured as a contiguous piece from a mold with hard plastic to integrate the adapter so that the adapter breaks free to couple to the storage drive carrier when a small size drive is to be held. Snaps in the contiguous piece couple with the adapter after the adapter is broken free to store the adapter when a larger sized drive is held by the storage drive carrier.

20 Claims, 10 Drawing Sheets

FIG. 3A

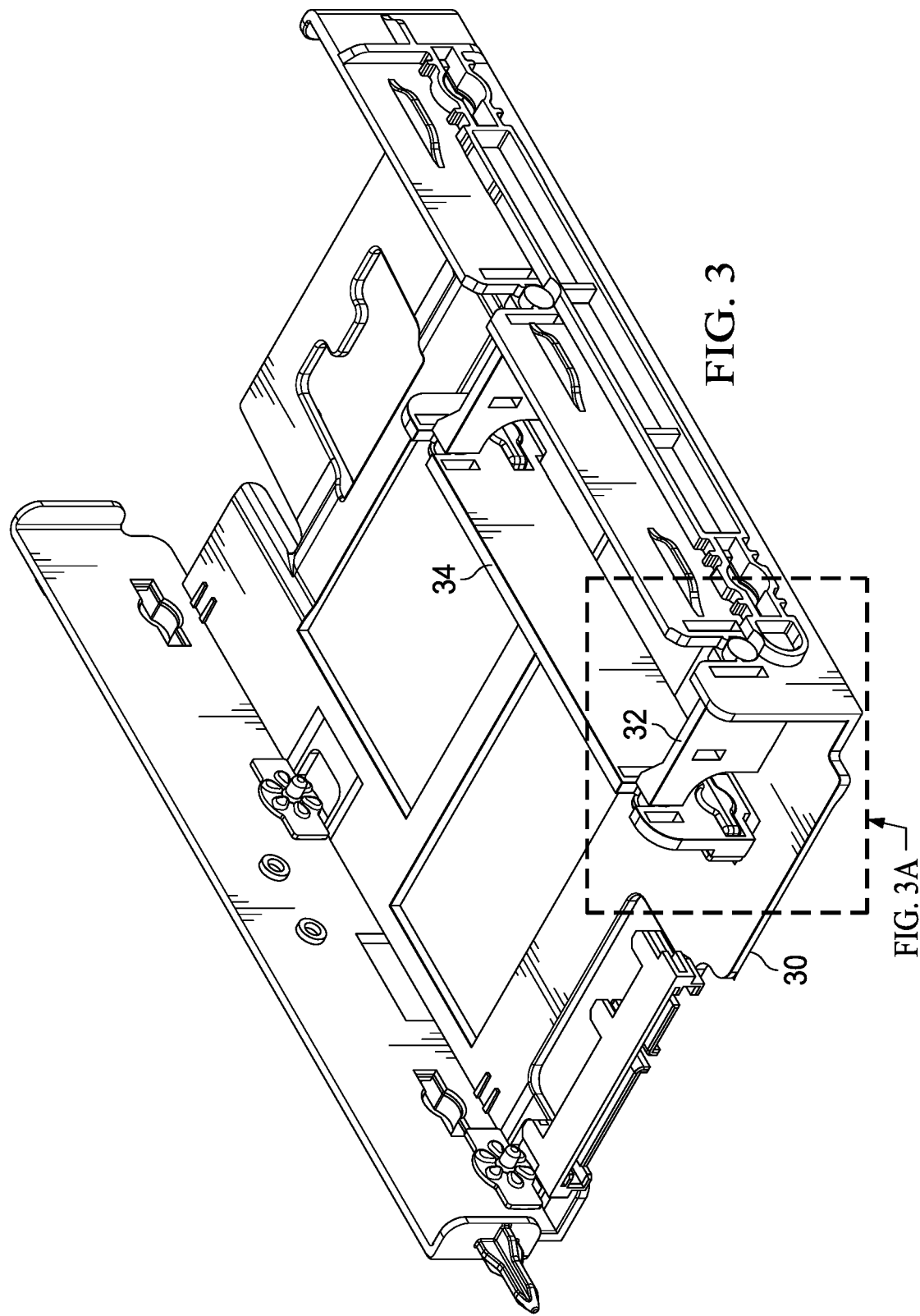

INFORMATION HANDLING SYSTEM STORAGE DRIVE CARRIER

BACKGROUND OF THE INVENTION

Field of the Invention

The present invention relates in general to the field of information handling system storage, and more particularly to an information handling system storage drive carrier.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems create, store and retrieve information. Generally, an operating system, applications and information are stored in persistent memory that maintains the information during power down periods. Typically, persistent storage is organized in solid state or hard disk drives that couple to standardized interfaces, such as SATA, SAS, PCIe and NVMe interfaces. To simplify installation and swapping out of storage devices, information handling systems often include standardized slots to accept drive carriers of a standardized size. Drive carriers offer several advantages, including enabling easy blind-mate connection of the storage devices to the standardized connectors with alignment guided by drive carrier interaction with the information handling system housing. In server information handling systems, several banks of storage drives may reside in a housing so that drive carriers aid in maintenance and hot swapping of storage devices while the system is operating.

Hard disk drive storage devices typically are manufactured in 3.5 inch and 2.5 inch sizes. Solid state drive storage devices typically are manufactured in 2230 and 2280 sizes (defined generally as 22 mm width and either 30 mm or 80 mm length). Some solid state drive devices are also available in 2.5 inch size, such as the Samsung Pro SATA 2.5 Inch SSD. A difficulty that arises with the different sized storage devices is that drive carriers have to accept both sizes and align the connector for both sizes when the drive carrier couples to the information handling system housing. Typically 3.5 inch drive carriers have an adapter that fits into the drive carrier to hold a 2.5 inch drive in place and aligned with the connector. When an end user has a new drive carrier that accepts a 3.5 inch drive, the end user will typically discard the adapter as unnecessary. A difficulty that can arise with this is that the drive carrier becomes unusable for a subsequent 2.5 inch drive replacement. For example, one conventional solution is rectangular adapter piece that fits into the drive carrier to define a boundary in which the 2.5 inch drive fits. If a 3.5 inch drive is installed in the drive carrier, the adapter is removed and the 3.5 inch drive fits into place.

Another difficulty that arises with the use of drive carriers that have an adapter to fit 3.5 inch and 2.5 inch drives is that the manufacture of the adapter increases drive carrier costs. For example, separate design and tooling costs are involved in the manufacture of each of the drive carrier and the adapter. Further, the separate parts are typically tracked as separate inventory to include ensuring compatibility of a particular adapter and drive carrier as parts change over time. Although adapters add costs and complexity to drive carrier manufacture and use, the availability of an adapter tends to be less expensive and more simple than having separate inventories of 3.5 inch and 2.5 inch drive carriers.

SUMMARY OF THE INVENTION

Therefore, a need has arisen for a system and method which adapts a storage drive carrier to convert between first and second storage drives of different sizes.

In accordance with the present invention, a system and method are provided which substantially reduce the disadvantages and problems associated with previous methods and systems for adapting a storage drive carrier to hold storage drives of different sizes. A storage drive carrier that fits a storage drive of a first size integrates an adapter that breaks away and then assembles into the storage drive carrier to define a space that fits a storage drive of a second size.

More specifically, an information handling system processes information with a processor and memory disposed in a housing and stores the information in persistent storage devices, such as hard disk drives and solid state drives. The storage drives fit into a storage bay having plural slots that are sized to accept storage drive carriers of a defined size, such as storage drive carriers that accept a 3.5 inch storage drive. The storage drive carrier holds a full sized storage drive on a support base between opposing walls having space defined to fit the storage drive, such as dimensions to fit a 3.5 inch storage drive. An adapter integrates in the storage drive carrier and breaks away to assemble so that the storage drive carrier adapts to accept a smaller storage drive, such as a 2.5 inch storage drive. For example, the storage drive carrier and adapter are manufactured in the same injection molding tool so that the storage drive carrier will accept the full size storage drive with the adapter still integrated in the storage drive carrier. The adapter breaks away and assembles a sidewall to define the space for the smaller storage drive to fit into with the sidewall held in place by a set of one or two braces. The adapter has a tool-less assembly into the storage drive carrier, such as with snaps. After the adapter breaks away from the storage drive carrier, if a full size storage drive is held, the adapter couples to the bottom side of the storage drive carrier for storing when not in use.

The present invention provides a number of important technical advantages. One example of an important technical advantage is that a storage drive carrier with an integrated adapter is manufactured with a reduced tooling cost and material savings so that an adapter breaks away to convert the storage drive carrier from fitting a first sized storage drive to fitting a second sized storage drive. The storage drive carrier fits a 3.5 inch storage drive as manufactured and converts to fit a 2.5 inch storage drive with an adapter integrated in the storage drive carrier at manufacture. As long as the storage drive carrier is used to support a 3.5 inch storage drive, the adapter remains integrated in place; once a 2.5 inch storage drive is desired, the adapter breaks free and assembles into place to convert the storage drive carrier to hold the 2.5 inch storage drive. If a 3.5 inch storage drive is subsequently desired, the adapter disassembles to allow for a larger storage drive and then stores at snaps included in the storage drive carrier. As a result, dual storage drive sizes are supported without extra tooling and parts or waste for reduced costs and improved sustainability. Although the example embodiment addresses hard disk drive carriers, alternative embodiments may address solid state drive carriers and other types of device carriers, such as batteries.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3, 3A and 3B depict an example embodiment of an adapter that couples to a storage drive carrier;

DETAILED DESCRIPTION

An information handling system storage bay accepts storage drives in storage carriers having a breakaway integrated adapter to convert between holding storage drives of a first and second size. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
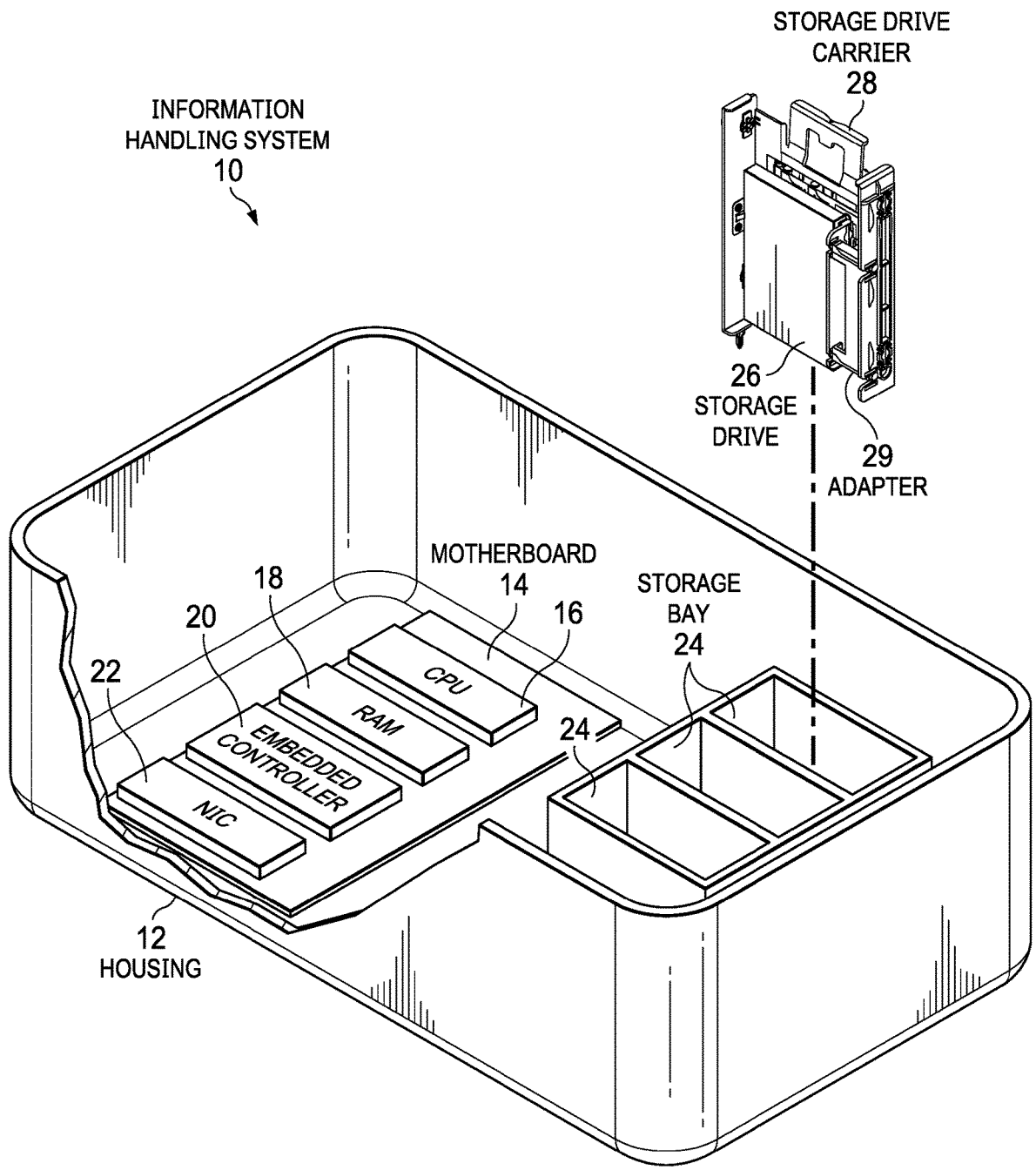
FIG. 1 depicts a side perspective view of an information handling system having a storage bay configured to accept storage drive carriers with storage drives of first and second sizes.

Referring now to FIG. 1, a side perspective view depicts an information handling system 10 having storage bays 24 configured to accept storage drive carriers 28 with storage drives 26 of first and second sizes. In the example embodiment, information handling system 10 processes information with processing components disposed in a housing 12 and communicating through a motherboard 14. For example, a central processing unit (CPU) 16 executes instructions to process information with the instructions and information stored in a random access memory (RAM) 18. An embedded controller 20 manages physical interactions of the processing components, such as application of power and maintaining thermal constraints. A network interface controller (NIC) 22 supports communication with a network, such as through Ethernet cables or other interfaces. Storage bays 24 accept storage drives 26 that are inserted into storage drive carriers 28 to provide alignment with connectors disposed in storage bays 24, such as for hot swap insertion and removal. As an example, information handling system 10 is a server that stores information in persistent memory of storage drives 26, such as hard disk drives (HDD) or solid state drives (SSD). The storage devices may come in 3.5 inch or 2.5 inch sizes. In order to support both sizes of storage drives 26 in storage drive carrier 28, an integrated breakaway adapter 29 of storage drive carrier 28 couples within the interior of the drive carrier to convert the storage drive carrier from holding storage drives of the 3.5 inch storage drive size to holding storage drives of the 2.5 inch storage drive size.

Figure 2A:
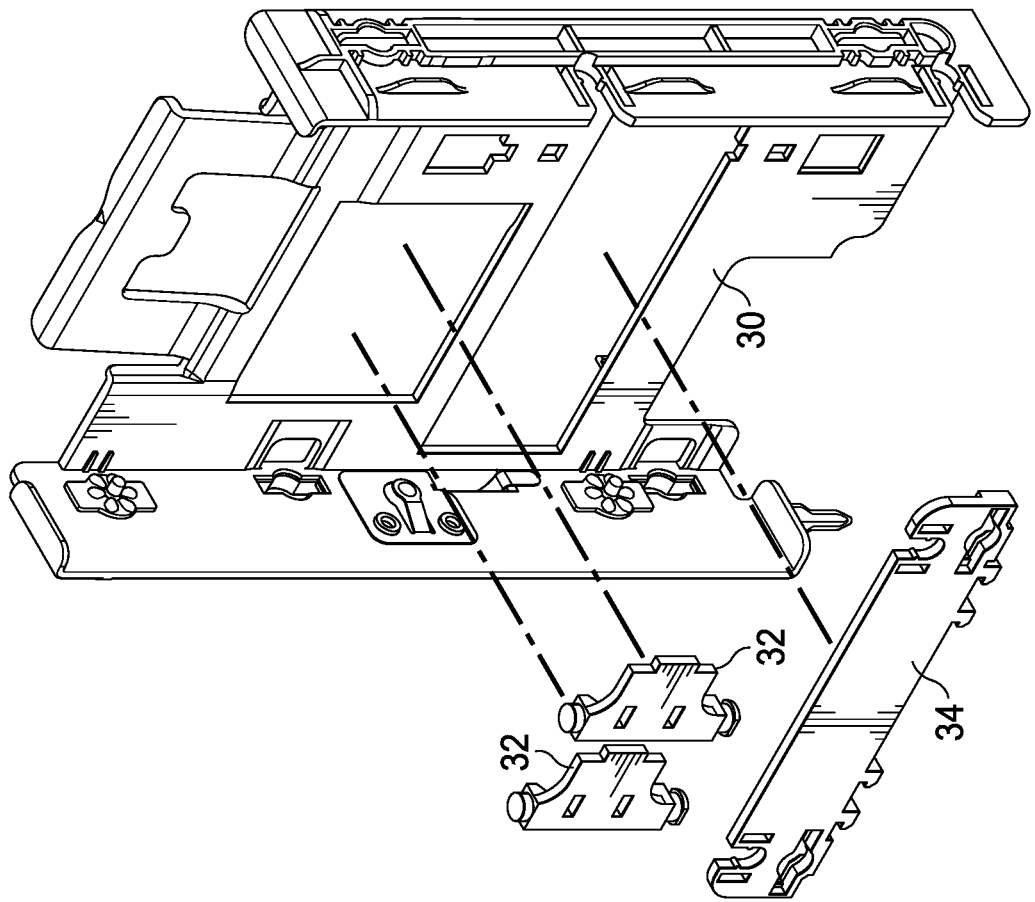
FIGS. 2, 2A, 2B, 2C, 2D, and 2E depict a storage drive carrier having an integrated adapter to adapt the storage drive carrier to hold storage drives of first and second sizes.
Figure 2:
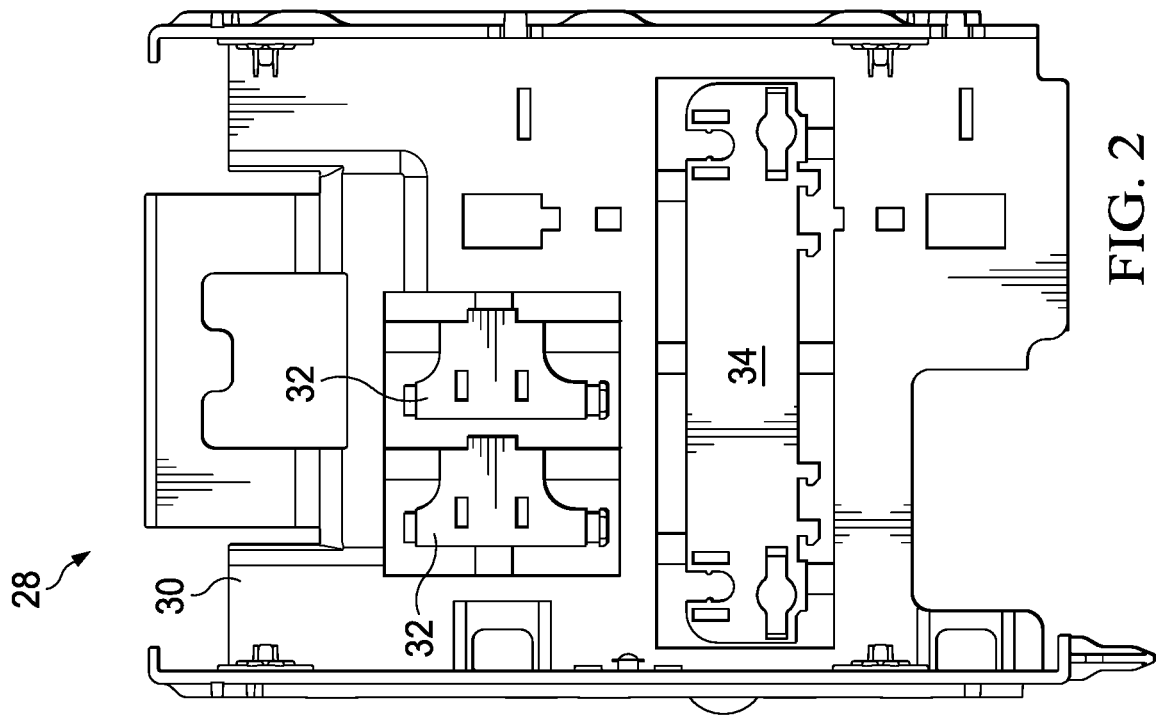
Figure 2B:
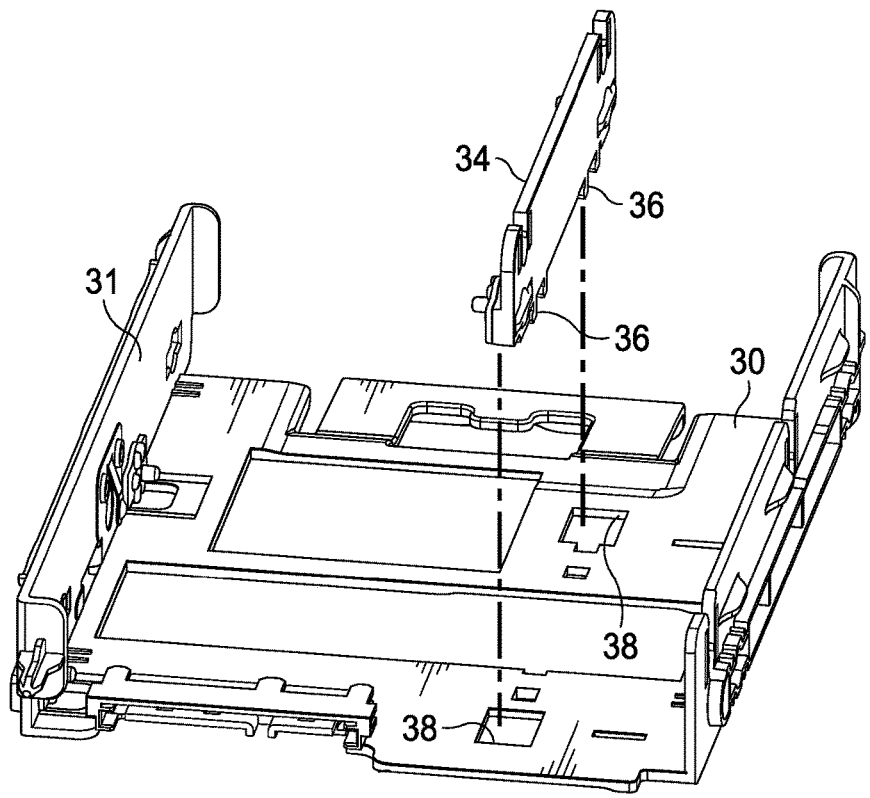

Referring now to FIGS. 2, 2A, 2B, 2C, 2D, and 2E, a storage drive carrier 28 is depicted having an integrated adapter to adapt the storage drive carrier to hold storage drives of first and second sizes. FIG. 2 depicts storage drive carrier 28 as produced by injection molding of a hard plastic material in a single injection molding tool. Storage drive carrier 28 has a support base 30 with opposing walls that define a space in which a 3.5 inch storage drive fits. When an end user couples a 3.5 inch storage drive to support base 30 the opposing walls align the connector of the storage drive so that insertion of the storage drive carrier into a storage bay establishes a communication interface with the information handling system motherboard. The end user snaps the 3.5 inch storage drive into place against support base 30 and then presses storage drive carrier 28 into place in storage bay. However, when the storage drive is a smaller sized 2.5 inch storage drive, the walls extending from support base 30 will not hold the storage drive in place or align the storage drive with a connector in the storage bay. In order to accept a smaller storage drive, the adapter is broken away from the contiguous plastic piece of support base 30 and assembled within storage drive carrier 28.

Figure 2C:
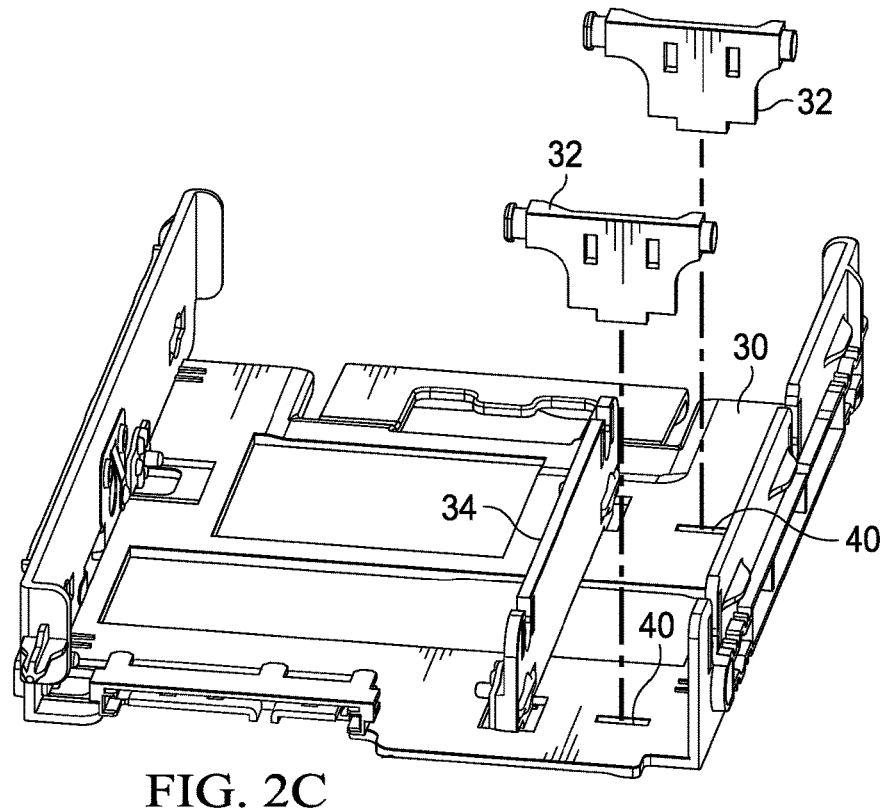
Figure 2D:
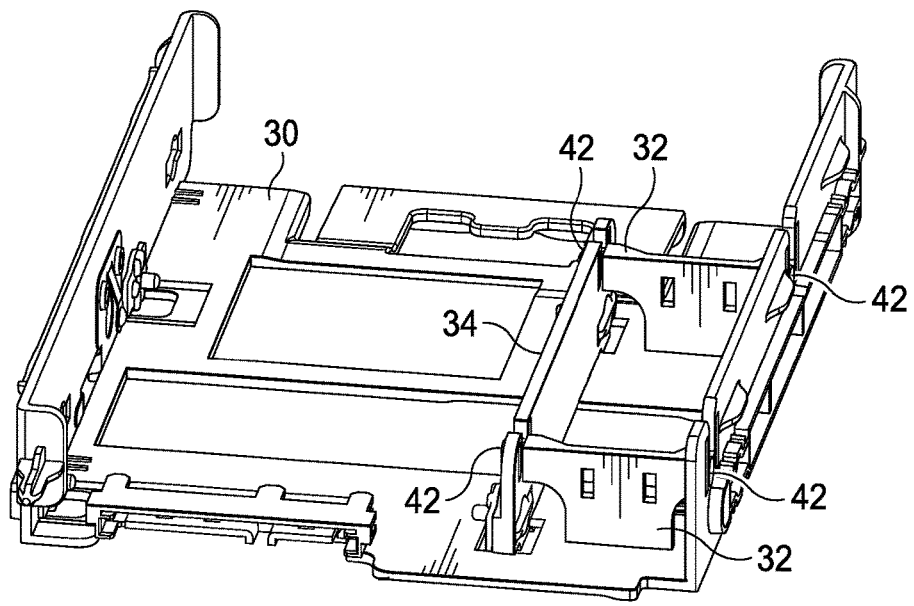
Figure 2E:
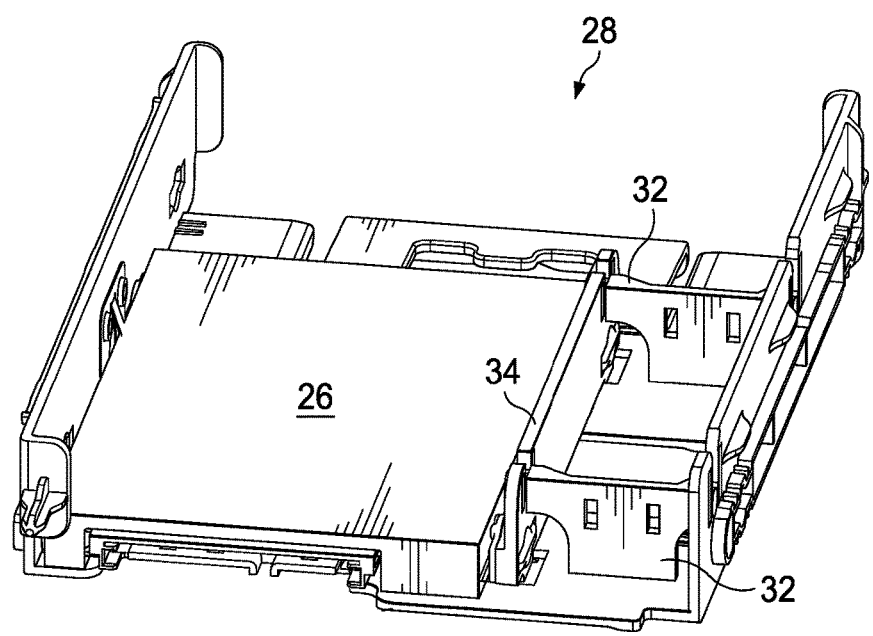

FIG. 2A depicts an example of an adapter broken away from support base 30 as three separate pieces. As an example, when support base 30 is manufactured by injection molding, a set of first and second braces 32 and a sidewall 34 are included in the injection molding tool with a reduced thickness at predefined breakaway points. FIG. 2A depicts braces 32 and sidewall 34 broken away from the contiguous plastic piece prepared for assembly at support base 30 and wall 31. FIG. 2C depicts sidewall 34 aligned with tabs 36 to couple into slots 38 of support base 30. Sidewall 34 is aligned parallel to the opposing walls of support base 30 and positioned to define a placement space for placement of a 2.5 inch storage drive within storage drive carrier 28. Once sidewall 34 is in place, first and second braces 32 fit at a bottom tab into slots 40 of support base 30. FIG. 2D depicts braces 32 having one end fit into a slot 42 of the walls of support base 30 and a second end fit into a slot of sidewall 34 so that sidewall 34 is held firmly in place at a location that provides support for a 2.5 inch storage drive. FIG. 2E depicts storage drive carrier 28 with adapter 29 assembled in place to hold the smaller sized storage drive 26 in place.

Figure 3A:
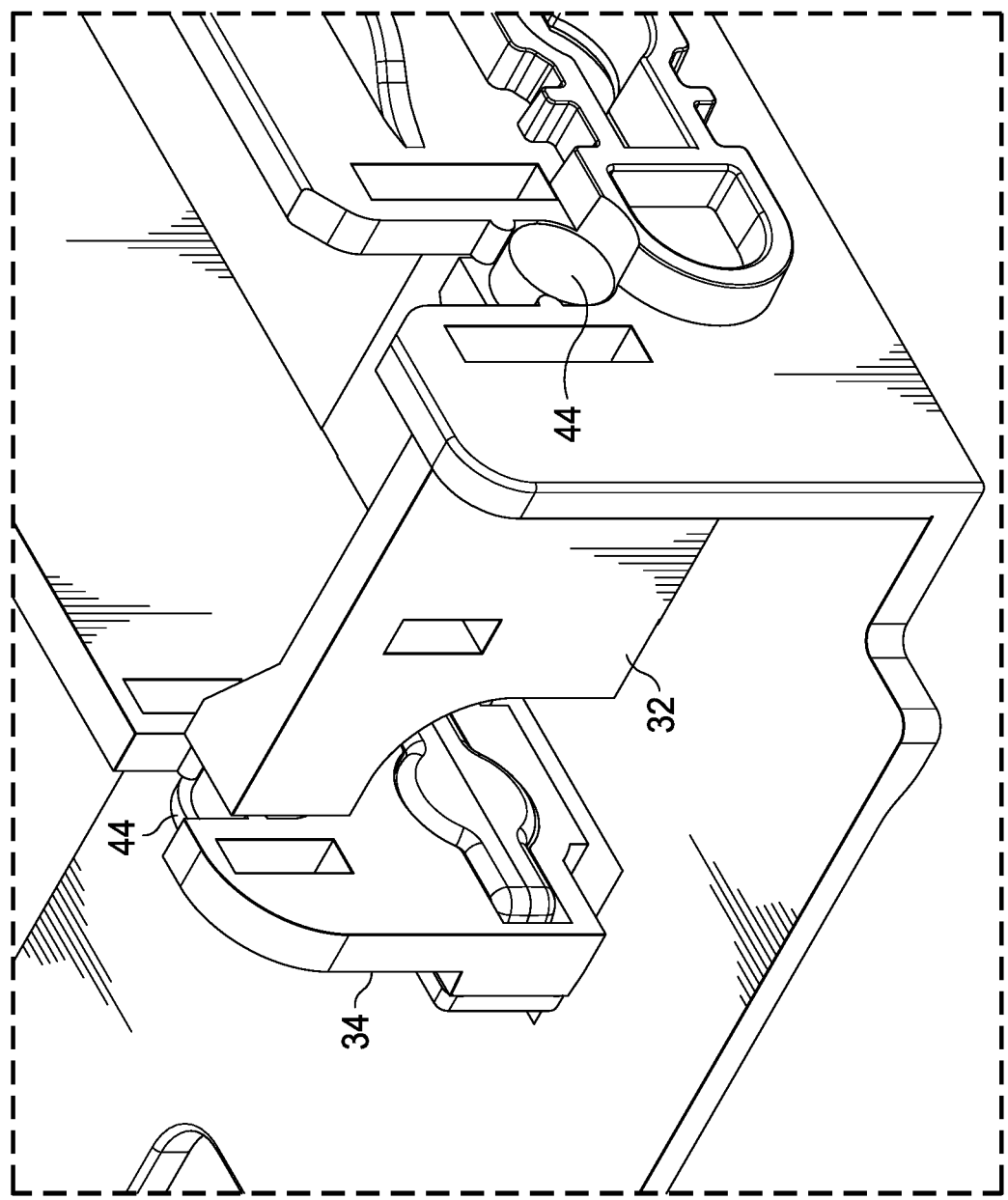
Figure 3B:
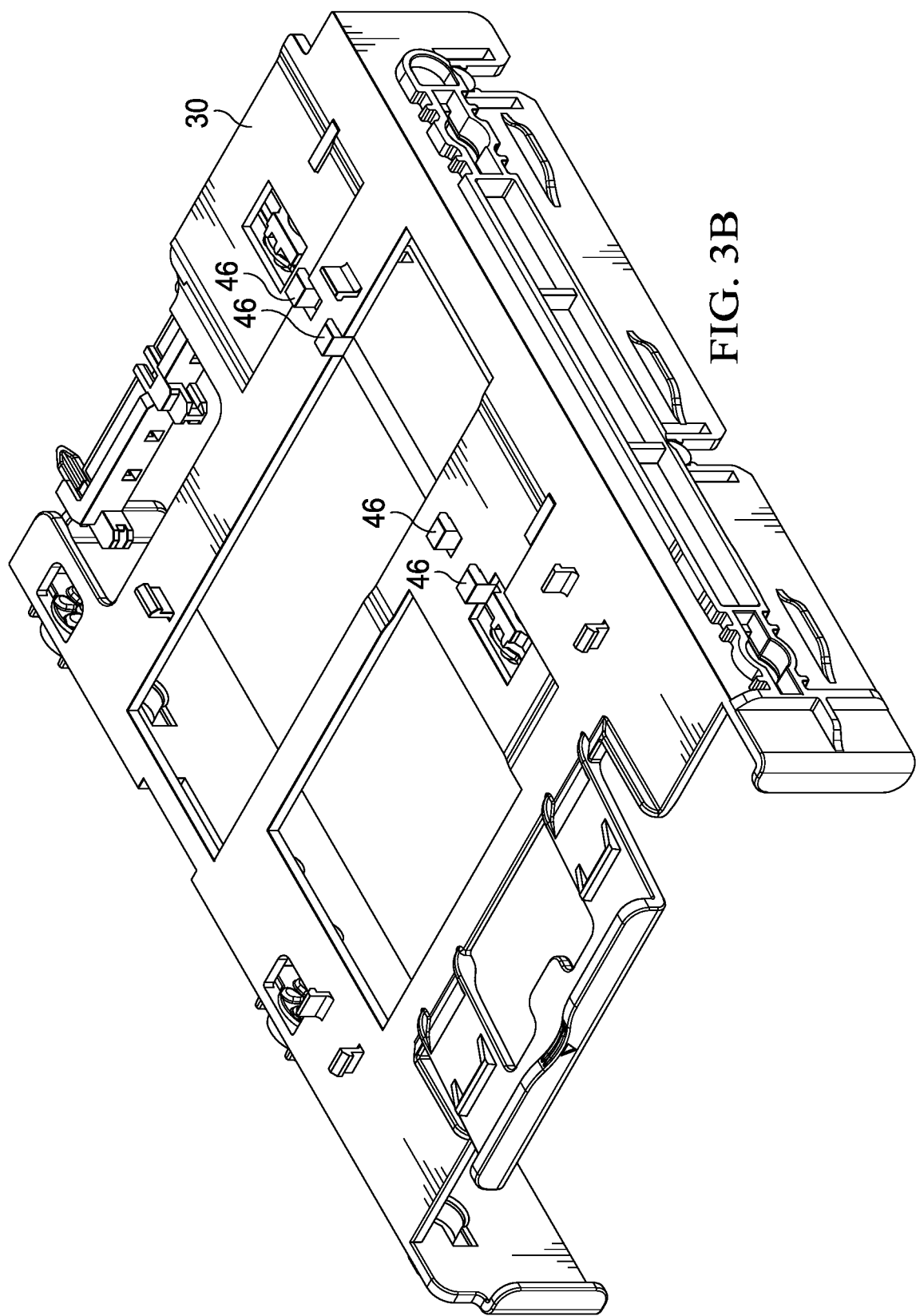

Referring now to FIGS. 3, 3A and 3B, an example embodiment depicts a side perspective view of an adapter that couples to a storage drive carrier. FIG. 3 depicts brace 32 coupled into slots formed in sidewall 34 to hold sidewall 34 at a defined spacing. FIG. 3A depicts a detailed view of brace 32 coupled to sidewall 34 and the wall of support base 30 with a slot 44 formed on each end of brace 32 to hold brace 32 in place. Snaps formed in sidewall 34 and the wall of support base 30 compress against brace 32 to lock brace 32 into position in slot 44. FIG. 3B depicts the bottom side of support base 30 having tabs 46 of the sidewall inserted into slots 44 and slid to press against the bottom surface of support base 30 so that the sidewall is held firmly in place and prevented from sliding by engagement of braces 32.

Figure 4:
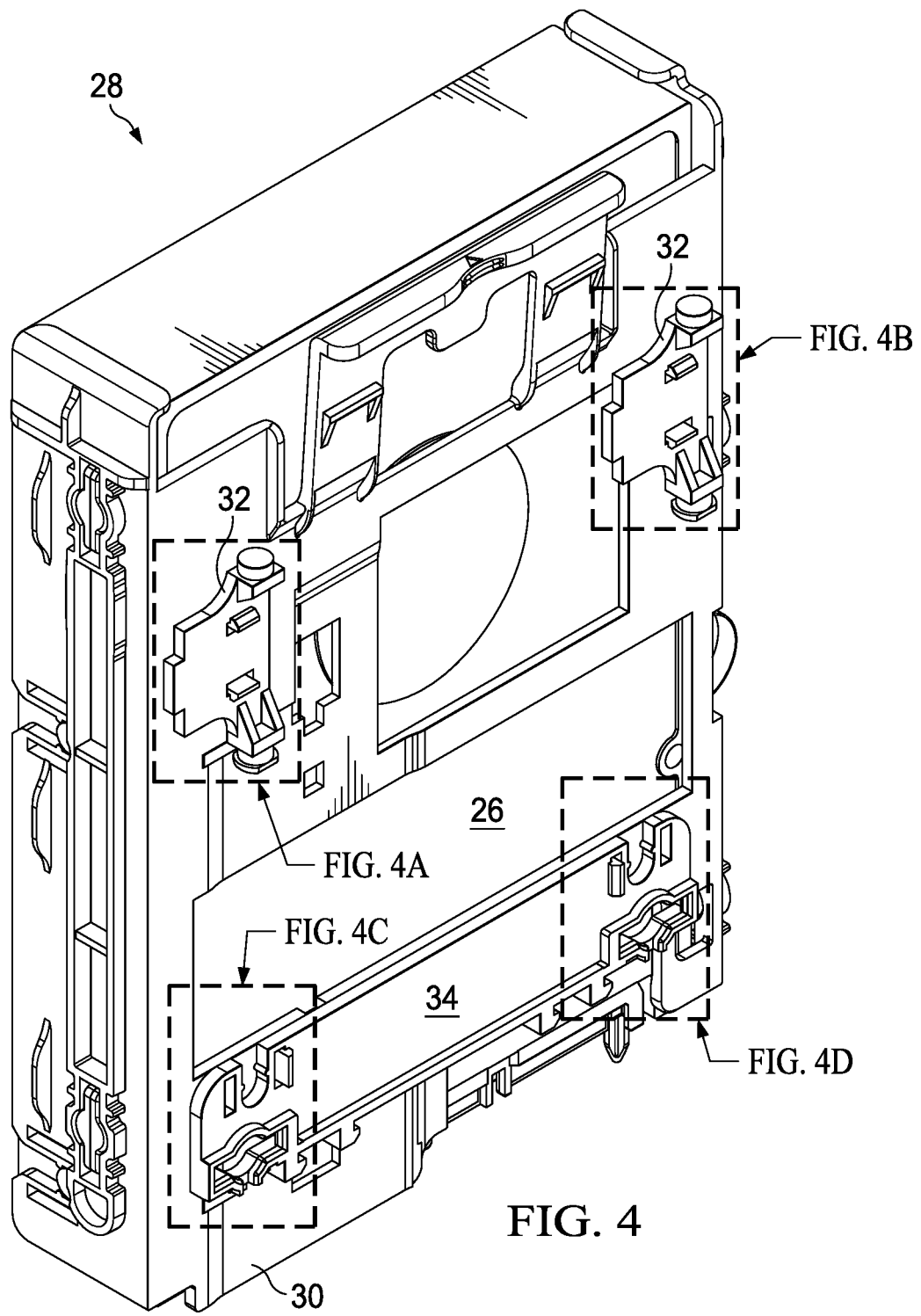
FIGS. 4, 4A, 4B, 4C and 4D depict an example embodiment of a storage drive carrier having snaps that couple an adapter after the adapter breaks from the storage drive carrier.
Figure 4A:
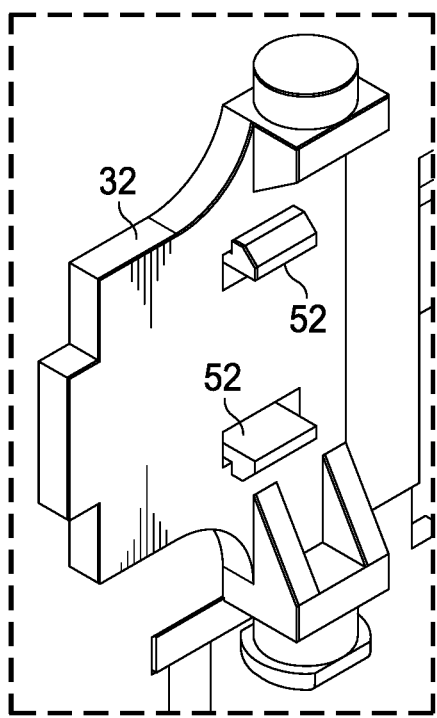
Figure 4B:
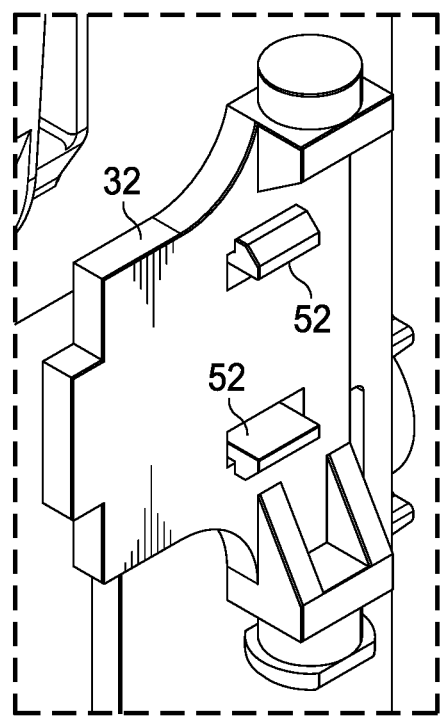
Figure 4C:
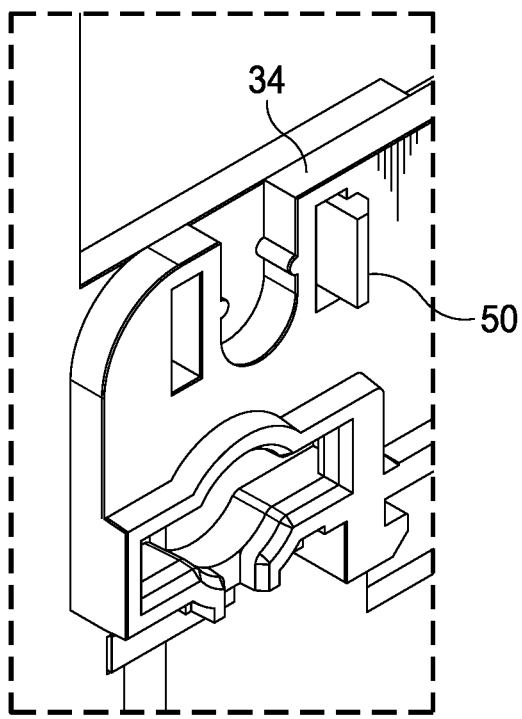
Figure 4D:
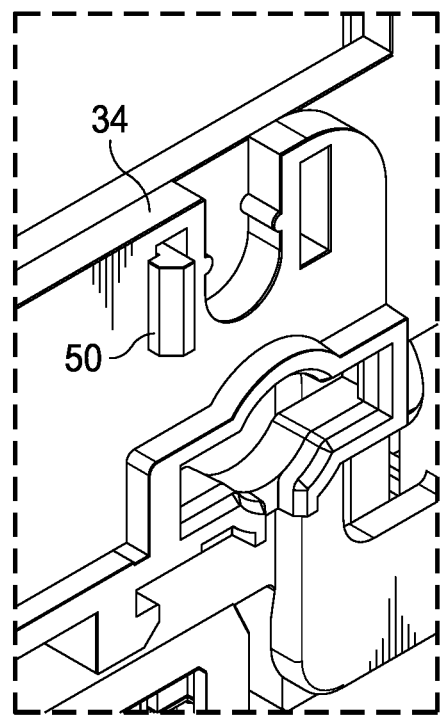

Referring now to FIGS. 4, 4A, 4B, 4C and 4D, an example embodiment depicts a storage drive carrier 28 having snaps 50 and 52 that couple an adapter after the adapter breaks from the storage drive carrier. FIG. 4 depicts braces 32 and sidewall 34 stored at the bottom side of storage drive carrier 28 after being broken away. Storage of the adapter at the bottom side allows the use of storage drive carrier 28 for a full size 3.5 inch storage drive while keeping the adapter stored out of the way in the event the storage drive carrier is subsequently adapted to accept a 2.5 inch storage drive. FIGS. 4A and 4B depict a detailed view of brace 32 coupled by snaps 52 to the bottom surface of support base 30. FIGS. 4C and 4D depict a detailed view of sidewall 34 coupled by snaps 50 to the bottom surface of support base 30. Snaps 50 and 52 are, for example, formed with support base 30 at injection molding. In alternative embodiments, other types of coupling may be used, such as insertion of an extension from brace 32 and sidewall 34 through an opening of support base 30. The adapter may also store at alternative locations, such as a wall of support base 32 or snaps formed in the storage bay that accepts the storage drive carriers.

Figure 5B:
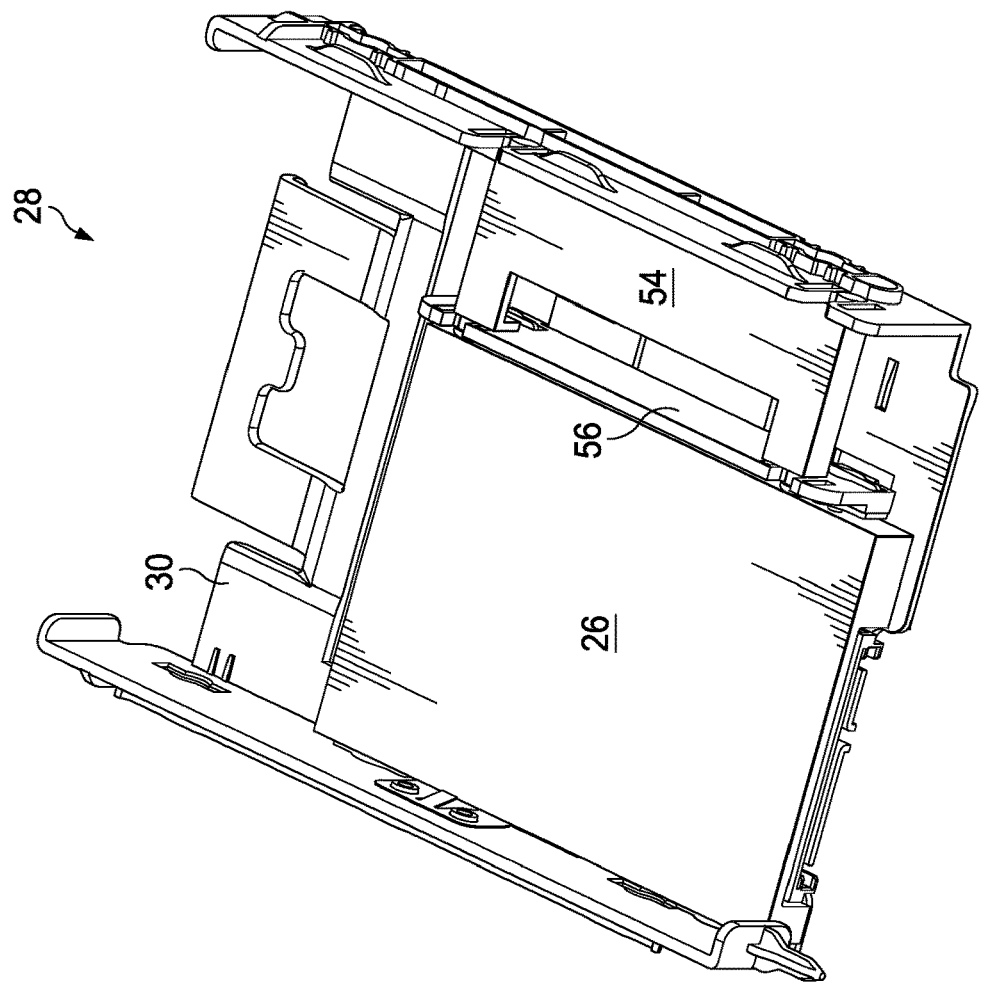
FIGS. 5A and 5B depict an alternative embodiment of an integrated breakaway adapter to adapt a storage drive carrier from holding a storage drive of a first to a second size.
Figure 5A:
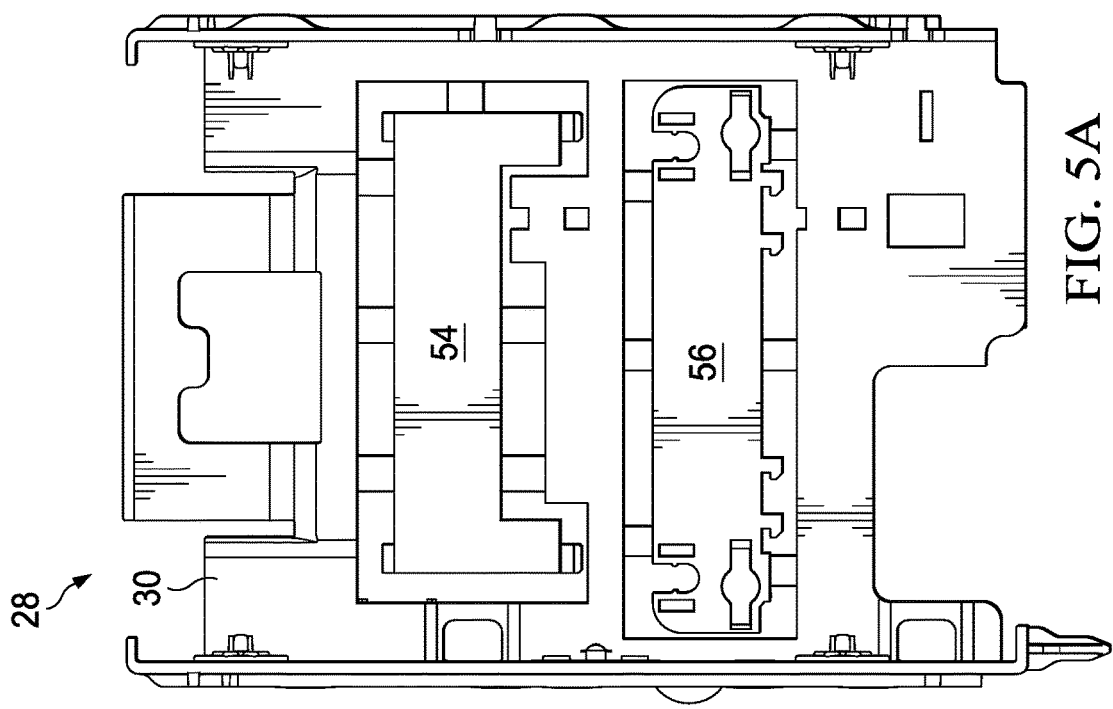

Referring now to FIGS. 5A and 5B, an alternative embodiment depicts an integrated breakaway adapter to adapt a storage drive carrier 28 from holding a storage drive 26 of a first to a second size. FIG. 5A depicts storage drive carrier 28 as initially released from the injection molding tool with a single support wall 56 held in place by a single brace 54. Support wall 56 and brace 54 integrate with support base 30 at defined breakaway points so that, once broken free they couple to support base to define a smaller storage drive carrier as depicted by FIG. 5B.

Although the example embodiment relates to hard disk drive carriers, in alternative embodiments other types of device carriers may be used. For example, a solid state drive carrier may adapt to carry both 2230 and 2280 sized solid state drives. As another example, a battery carrier may adapt to carry different sized batteries and/or different numbers of battery cells. Other types of device carriers may also include adapters that break off from an original manufactured contiguous piece and assembled into the adapter to change the internal configuration as needed to accept different types, numbers and/or sizes of components.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions;
   a memory disposed in the housing and interfaced with the processor, the memory operable to store the instructions and information;
   a storage bay configured to accept plural storage drive carriers of a first size; and
   a storage drive carrier of the first size having an interior configured to hold a storage drive of the first size, the storage drive carrier integrating an adapter configured to break free as at least three separate pieces and assemble into the interior to adapt the storage drive carrier to hold a storage drive of a second size smaller than the first size.

2. The information handling system of claim 1 further comprising:
   one or more snap couplers integrated in the storage drive carrier and configured to couple with the at least three separate pieces of the adapter after the adapter is broken free to hold the adapter when not assembled into the interior.

3. The information handling system of claim 2 wherein:
   the storage drive carrier comprises a support base and opposing walls extending up from the support base, opposing walls defining a space of the first size; and
   the adapter integrates in the support base until broken free and couples to the snap couplers after broken free.

4. The information handling system of claim 3 wherein the support base, opposing walls and adapter are formed in a one plastic injection mold.

5. The information handling system of claim 1 wherein the adapter comprises:
   a sidewall; and
   a brace separate from the sidewall when broke fee, the brace configured to couple to the sidewall and one of the opposing walls to hold the sidewall at a boundary defined for a storage device of the second size.

6. The information handling system of claim 5 wherein the brace comprises first and second brace pieces that couple perpendicular to the sidewall and the one of the opposing walls.

7. The information handling system of claim 6 further comprising snaps integrated in a bottom surface of the support base and configured to couple to the first and second brace pieces and the sidewall.

8. The information handling system of claim 7 further comprising a 3.5 inch hard disk drive coupled in the storage drive carrier.

9. The information handling system of claim 8 further comprising a 2.5 inch hard disk drive coupled in the storage drive carrier.

10. A method for adapting a storage drive carrier to hold first and second storage drive sizes, the method comprising:
    breaking an adapter free from integration with the storage drive carrier, the adapter having at least three separate pieces, the storage drive carrier configured to fit the first storage drive size on a support base within a boundary defined by opposing walls; and
    coupling the adapter to one of the opposing walls to define a space that fits the second storage drive carrier size.

11. The method of claim 10 further comprising:
forming the drive carrier and adapter from plastic injected into a single mold; and
coupling a storage drive of the first size into the drive carrier before the breaking an adapter free.

12. The method of claim 10 wherein:
the adapter integrates in the support base; and
the adapter breaks free to leave an opening in the support base.

13. The method of claim 10 wherein the coupling the adapter further comprises:
coupling a sidewall portion of the adapter at a slot formed in the support base; and
coupling a brace portion of the adapter separate from the sidewall to the one of the opposing walls and to the sidewall portion.

14. The method of claim 13 wherein the brace portion comprises first and second separate braces coupled in a spaced relationship perpendicular to the sidewall portion and the one of the opposing walls.

15. The method of claim 10 further comprising:
de-coupling the adapter from the storage drive carrier; and
coupling the adapter to storage snaps formed in the drive carrier and separate from a location where the adapter breaks free.

16. The method of claim 15 further comprising:
coupling a first-sized solid state drive in the drive carrier when the adapter couples to the one of the opposing walls; and
coupling a second-sized solid state drive in the drive carrier when the adapter couples to the storage snaps.

17. A storage drive carrier comprising:
a contiguous plastic piece formed to hold a storage device of a first size in a space defined by a support base and opposing walls, the contiguous plastic piece integrating an adapter having defined break points to separate from the contiguous plastic piece as at least three separate pieces and configured to couple to the contiguous plastic piece to define space to hold a storage device of a second size.

18. The storage drive carrier of claim 17 wherein the adapter comprises:
a sidewall configured to couple to the support base parallel to the opposing walls to define the space to hold the storage device of the second size; and
a brace separate from the sidewall configured to couple between the sidewall and one of the opposing walls to hold the sidewall in place.

19. The storage drive carrier of claim 18 further comprising:
snap connectors formed in the contiguous plastic piece separate from the break points and operable to store the adapter after the adapter separates from the contiguous plastic piece.

20. The storage drive carrier of claim 19 wherein the brace comprises first and second brace pieces coupled in a spaced parallel relationship perpendicular to the sidewall and one of the opposing walls.

* * * * *